United States Patent [19]

Chang

[11] 3,720,928

[45] March 13, 1973

[54] SENSING OF CYLINDRICAL MAGNETIC DOMAINS

[75] Inventor: Hsu Chang, Yorktown Heights, N.Y.

[73] Assignee: International Business Machines Corporation, Armonk, N.Y.

[22] Filed: May 21, 1971

[21] Appl. No.: 145,656

[52] U.S. Cl. .........340/174 TF, 340/174 EB, 340/174 HA, 340/174 M, 340/174 YC

[51] Int. Cl. ...........................G11c 11/14, G11c 5/06

[58] Field of Search .................................340/174 TF

[56] References Cited

UNITED STATES PATENTS

| | | | |
|---|---|---|---|
| 3,609,720 | 9/1971 | Strauss | 340/174 TF |
| 3,513,452 | 5/1970 | Bobeck et al. | 340/174 TF |

OTHER PUBLICATIONS

IBM Technical Disclosure Bulletin, Vol. 13, No. 5, Oct. 1970, pp. 1209–1210.

*Primary Examiner*—James W. Moffitt
*Attorney*—Hanifin and Jancin and Jackson E. Stanland

[57] ABSTRACT

An apparatus for cylindrical magnetic domains in which the sensing elements for detecting the presence and absence of cylindrical domains are spatially staggered in each information channel so as to effect a time phase between successive output signals. In contrast with previous sensing devices for cylindrical domains, an increased number of information channels can be read during each cycle of propagation (the time for a domain to move one bit position). A plurality of information channels is provided on the magnetic sheet, and the sensing means for detection of domains in each channel is staggered spatially with respect to the sensing means in the adjacent channels. A single sense amplifier can be used for all sensing means, and the data rate per channel is correspondingly increased.

14 Claims, 5 Drawing Figures

INVENTOR
HSU CHANG

BY J. E. Stanland

AGENT

SENSING OF CYLINDRICAL MAGNETIC DOMAINS

BACKGROUND OF THE INVENTION

1. Field of the Invention

This invention relates to an apparatus using cylindrical magnetic domains, and more particularly to an improved sensing means for such domains.

2. Description of the Prior Art

Cylindrical magnetic domains having their magnetization vectors normal to the magnetic sheet in which the domains exist and in the reverse direction to the magnetization of the sheet are known in the art, as can be seen by referring to U.S. Pat. No. 3,460,116. These domains are single wall domains whose magnetization is oppositely directed to the magnetization of the sheet. The domains can be propagated to various locations in the sheet by conventional means, such as magnetic overlays and conductor overlays. The size of the domains is stabilized by a bias field normal to the magnetic sheet. Means are known for generating domains at selected locations in the magnetic sheet, as can be seen by referring to a copending application Ser. No. 103,048, filed Dec. 30, 1970 and now U.S. Pat. No. 3,662,359 and assigned to the present assignee.

The presence and absence of cylindrical domains is indicative of a binary 1 or binary 0. Therefore, domain movement corresponds to transfer of information, and useful devices such as memories and displays can be made.

Various means are available for sensing the presence and absence of these domains. For instance, the domains can be sensed inductively by a conductor loop, such as is done in U.S. Pat. No. 3,508,222. The time change of magnetic flux associated with the domain causes an output signal in a conductor loop, which can serve many information channels, as is shown in FIG. 4 of this reference.

Another sensing scheme employs the Kerr or Faraday effect, since the presence and absence of domains will differently affect the passage of polarized light through the magnetic sheet. An example of this technique is shown in U.S. Pat. No. 3,515,456.

Another suitable sensing technique employs magneto-resistive elements which undergo a resistance change in the presence of cylindrical domains. This resistance change is manifested as a voltage output. Copending applications Ser. No. 78,531, filed Oct. 6, 1970, and now U.S. Pat. No. 3,691,540 and Ser. No. 89,964, filed Nov. 16, 1970, both of which are assigned to the present assignee, describe magneto-resistive sensing of cylindrical domains.

Another sensing technique uses the Hall effect to indicate the presence and absence of cylindrical domains. In this technique, a semiconductor element is placed adjacent to the path followed by a domain and the Hall voltage developed as a result of the stray magnetic field of the domain is sensed.

Because cylindrical domains have stray magnetic fields associated with them, adjacent domains interact to repel one another. Therefore, practical devices have domains separated by three or four domain diameters in order to avoid this mutual interaction. The data rate in each information channel is limited by the domain propagation speed, which is in turn determined by domain wall mobility. To make faster devices, one approach is to increase the mobility of the magnetic material. Even with increased mobility, the limitations of existing data readout schemes limit the overall device speeds. For instance, an inductive sensing scheme is shown in U.S. Pat. No. 3,508,222. A single conductor loop can be used to bridge many information channels. However, only one cylindrical domain at a time can enter this loop in order to avoid multiple readout. In addition, the domains are expanded in the sense loop to increase the output signal. The delay in reading information from all channels and the delay resulting from domain amplification limits the speed of devices having this type of readout.

It is also possible to provide multiple sensing devices so that each information channel is provided with its own sensing elements. However, it is not possible to use a single sense amplifier in such systems, as the output signal from each sense element will occur at the same time. This is because information in parallel channels propagates in unison at the same rate.

The prior art sensing techniques have not increased the data rate per information channel while minimizing the hardware required.

Accordingly, it is a primary object of this invention to provide an apparatus for cylindrical magnetic domains in which the data rate per information channel is increased.

It is another object of this invention to provide an apparatus for cylindrical magnetic domains in which an increased data rate per information channel is obtained without increasing the required readout apparatus.

Still another object of this invention is to obtain increased data rates per information channel in a cylindrical domain apparatus, wherein existing sensing elements can be used, while minimizing the total number of sensing components.

SUMMARY OF THE INVENTION

A magnetic sheet, such as orthoferrite or garnet, contains cylindrical magnetic domains. Located on the magnetic sheet are a plurality of propagation means, such As circuit patterns comprised of magnetically soft elements or conductor loops. As an alternative, a plurality of magnetic sheets can be used having at least one propagation means on each sheet. The various propagation means provide information channels for the domains, whose presence and absence can be representative of binary information. Domains are created in the magnetic sheet by conventional techniques, and the various propagation means selected are also conventionally known. Bias means for creating a stabilizing magnetic field normal to the magnetic sheet is also provided. Again, this means is known in the prior art.

Associated with each information channel is a sensing means for detecting the presence and absence of cylindrical domains. The particular sensing device chosen for each channel is not critical, and any of the known sensing techniques can be used. The actual sensing element (or the light beam in the case of magneto-optical sensing) in each information channel is spatially staggered with respect to the sensing elements in the adjacent channel. This means that a plurality of output signals will be developed each time the cylindrical domains advance one bit position (the distance traversed by a domain during each cycle of propagation). A single sense amplifier is connected to the sensing devices associated with the channels for amplification of the sensing device outputs before utilization in external circuitry. Because the sensing elements are spatially staggered from one information channel to the next, time phasing of the output signals from the various channels results, thereby allowing a single sense amplifier to be employed.

The frequency of production of output signals from the sensing devices depends upon the spatial distance of each sensing device measured along the direction of domain propagation. This distance is determined in accordance with the duration of the output signal produced by each sensing device. In order to use a single sense amplifier, the output pulses from different sense devices must not overlap.

This sensing technique provides efficient use of a single sense amplifier and increases the overall data rate of a device, since many output signals result during each propagation cycle. In addition, ease of fabrication results and a minimum number of components is required.

The foregoing and other objects, features, and advantages of the invention will be apparent from the following more particular description of the preferred embodiments of the invention as illustrated in the accompanying drawings.

DESCRIPTION OF THE PREFERRED EMBODIMENTS

Figures 1, 2:
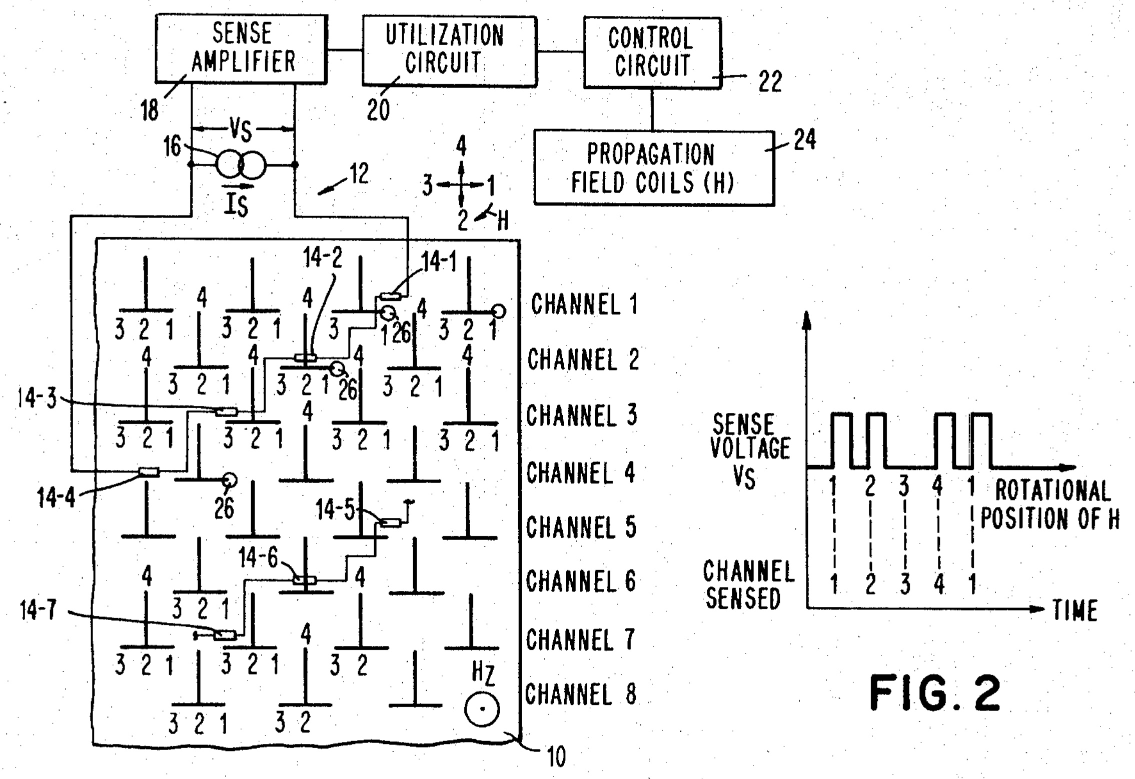
FIG. 1 is a top view of a cylindrical domain apparatus employing staggered magneto-resistive sensing elements.
FIG. 2 is a diagram of output voltage $V_s$ from the magneto-resistive sensing elements of FIG. 1 as a function of the rotational position of the propagation field H.

FIG. 1 shows a cylindrical domain apparatus having a plurality of information channels 1, 2, 3, . . . These information channels are comprised of propagation patterns located on magnetic sheet 10, which is any material that will sustain cylindrical domain propagation. Examples of such material include orthoferrites and garnets.

In FIG. 1, the information channels comprise permalloy T-bar arrays, the individual T-bars of each channel being arranged in a hexagonal packing arrangement with respect to the T-bar elements in adjacent channels. As is well known, this allows maximum packing density. Propagation of domains is from right to left in this embodiment, and occurs under the influence of rotating, in-plane magnetic field H. Thus, the numbers (1, 2, 3, 4) adjacent to the poles of the T-bar elements correspond to the production of magnetic poles on the T-bars as propagation field H rotates through positions 1, 2, 3, and 4. Stabilization of cylindrical domains within medium 10 is achieved by bias field $H_Z$, shown here as being normal to sheet 10 and directed upwardly out of the paper. Regulation of the strength of field $H_Z$ controls the diameter of cylindrical domains.

A sensing means 12 comprises sensing elements 14–1, 14–2, 14–3, and 14–4. These sensing elements are each associated with an individual information channel; for instance, element 14–1 is associated with information channel 1. The sensing elements can be any elements capable of detecting the presence of cylindrical domains. A particularly good sensing element is a magneto-resistive sensor, such as is described in aforementioned copending applications Ser. No. 78,531, and Ser. No. 89,964. Of course, the sensing elements could be Hall effect sensors, as is known in the art.

The individual sensing elements, 14–1, 14–2, . . . are connected in series to a constant current source 16 which supplies a measuring current $I_s$ through each series-connected sensing element. When a cylindrical domain passes by a sensing element, the magnetic field associated with the domain will magnetically interact with the sensing element, causing the magnetization vector associated with the magneto-resistive sensing element to rotate to a direction transverse to its normal position (along the easy axis). This will cause a resistance change in the sensing element, which will be detected as a voltage output $V_s$ across the sensing element. After passage of the domain, the magnetization vector will again rotate to a direction along the easy axis (the direction of current flow $I_s$ through the element).

A sense amplifier 18 amplifies the voltage outputs $V_s$, after which signals are delivered to utilization circuit 20. This circuit can be, for instance, a logic circuit utilizing the outputs from the information channels. Control circuit 22 controls the propagation field coils 24, which in turn provide the rotating magnetic field H. Control circuit 22 also synchronizes the utilization circuit in order to keep track of which information channel is being read at each rotational position of the magnetic field H.

In FIG. 1, four sensing elements 14–1, 14–2, 14–3, and 14–4 are connected together in the sensing device 12. Correspondingly, sensing elements 14–5, 14–6, 14–7, and 14–8 (not shown) will be connected together to form another sensing device for channels 5–8. In this manner, an output signal pulse is provided four times during the rotation of magnetic field H, rather than only once, as is customarily done in the prior art. It should be understood that additional sensing elements can be coupled together so that additional output pulses will occur during a single rotation of magnetic field H. In FIG. 1, the length of each sensing element 14-1, . . . , 14–N (where N is the number of information channels) is chosen to be approximately the diameter of the cylindrical domains. This will insure that the domain will switch the entire sensing element. Particular design considerations are detailed more thoroughly in aforementioned copending applications Ser. No. 78,531 and Ser. No. 89,964.

FIG. 2 shows the voltage output pulses $V_s$ from sensing means 12 plotted as a function of rotational position of the propagation field H, or as a function of time occurrence. This graph also shows which sensing element 14–1, . . . , 14–4 provides the voltage output. As is apparent from FIG. 1, cylindrical domains 26 are assumed to be present in information channels 1, 2, and 4, while being absent in the corresponding bit position of channel 3. Thus, there will be no voltage output $V_s$ when the propagation field H rotates to position 3 of this rotational cycle.

The width of the output voltage pulse $V_s$ depends upon the length of the sensing element 14–1, etc. in the direction of propagation of the domains. Generally, the length of the sensing element 14–1, etc. is approximately the diameter of a cylindrical domain. These sensing elements can be spaced more closely than at positions corresponding to positions 1–4 of the rotational field H. The frequency of occurrence of output pulses $V_s$ and the duration of each output pulse is adjusted so that the sense amplifier 18 will not be saturated while sensing these pulses. That is, the closeness (in the direction of domain travel) of sensing elements 14–1, etc. and the pulse width of the output pulses is adjusted so that there is no harmful overlap of output signals at the sense amplifier 18. These considerations are within the skill of the art of those familiar with sensing of magnetic arrays and will not be discussed further. It is sufficient to note that sensing means 12 having staggered sensing elements 14–1, etc. provides output pulses which are time phased throughout the rotational cycle of the drive field H. Rather than having only a single output pulse per cycle, time-separated multiple output pulses are provided, thereby allowing use of a single sense amplifier.

Figure 3:
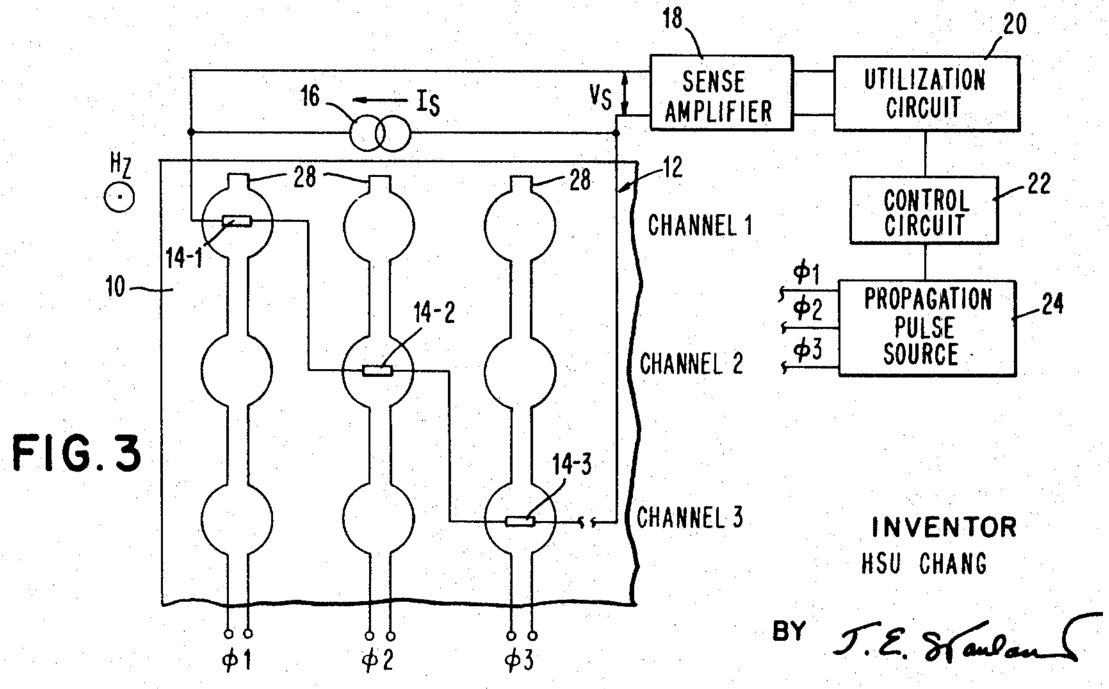
FIG. 3 is a top view of a conductor loop propagation network using staggered sensing elements for detection of cylindrical domains.

FIG. 3 shows another cylindrical domain apparatus, in which conductor loops 28 are used for propagation in each information channel 1, 2, 3, . . . . For ease of understanding, the same reference numerals will be used throughout.

Under the influence of time-phased current pulses $\phi 1$, $\phi 2$, $\phi 3$ cylindrical domains move from left to right across magnetic sheet 10. Located on sheet 10 is a sensing means 12, comprising sensing elements 14–1, 14–2, and 14–3. These elements could be, for instance, magneto-resistive sensing elements as were described with respect to FIG. 1. The sensing means also comprises constant current source 16 which provides measuring current $I_s$ through magneto-resistive sensing elements 14–1, etc. The leads connecting sensing elements 14–1, etc. to current source 16 are insulated from the conducting loops 28. As explained, a cylindrical domain will rotate the magnetization vector of the sense elements 14–1, etc., thereby causing voltage outputs $V_s$. Sense amplifier 18 amplifies the voltage outputs and supplies them to utilization circuit 20. Control circuit 22 controls the source 24 of drive current $\phi 1$, $\phi 2$, and $\phi 3$, and also indicates to utilization circuit 20 what information channel is being read. Bias field $H_Z$ exists normal to sheet 10 for stabilization of domains.

Since the sensing elements 14–1, 14–2, and 14–3 are spatially staggered, the voltage outputs $V_s$ produced by these elements will be time phased when entering sense amplifier 18. Multiple pulse outputs $V_s$ will be obtained during each drive phase comprising current inputs $\phi 1$, $\phi 2$, and $\phi 3$. This allows the use of a single sense amplifier with increased efficiency. If desired, additional sensing elements can be used thereby producing voltage outputs from more than three channels during each drive cycle.

Figure 4:
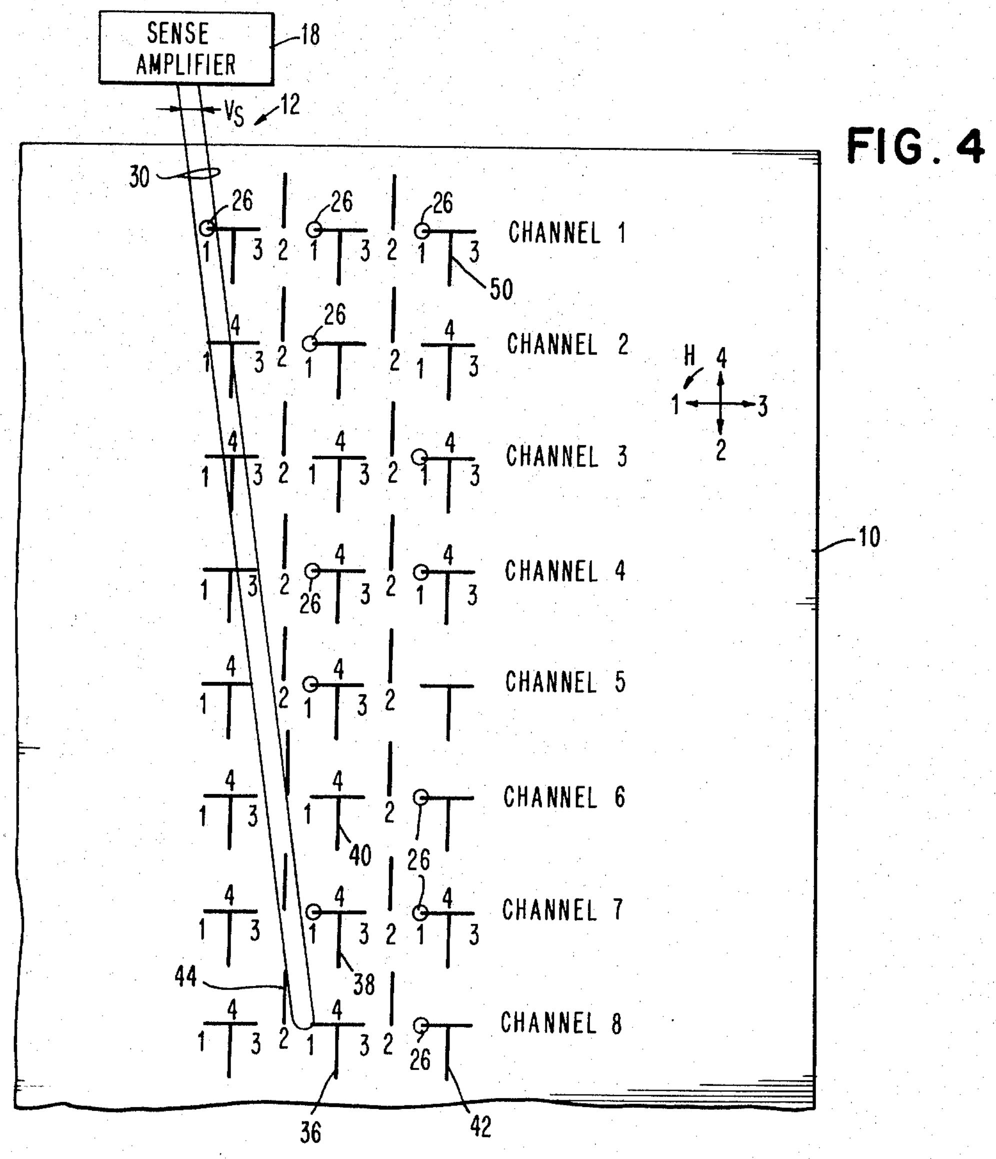
FIG. 4 is a top view of a cylindrical domain apparatus in which the outputs of a plurality of information channels are sensed by a single conductor loop.

FIG. 4 shows a cylindrical domain apparatus having eight information channels. In this embodiment, magnetic sheet 10 has permalloy T and I-bars thereon for propagation of cylindrical domains 26 in each information channel. Sensing means 12 comprises a conductor sense loop 30 which bridges all eight information channels. Sense amplifier 18 amplifies the outputs produced in loop 30. Not shown in this figure is the utilization circuit 20, control circuit 22, and propagation means 24, although it is to be understood that these elements function as described previously.

Since loop 30 is skewed with respect to the information channels, domains 26 are sensed during eight positions of rotation of propagation magnetic field H. In this embodiment, domains 26 travel from right to left in accordance with magnetic charges created at the pole positions 1, 2, 3, and 4 of the T and I-bar elements in each information channel. Because sense loop 30 is skewed across these eight information channels, information will be sensed from channel 8 first and then channel 7, etc. The outputs produced will be time-spaced at the sense amplifier 18.

Figure 5:
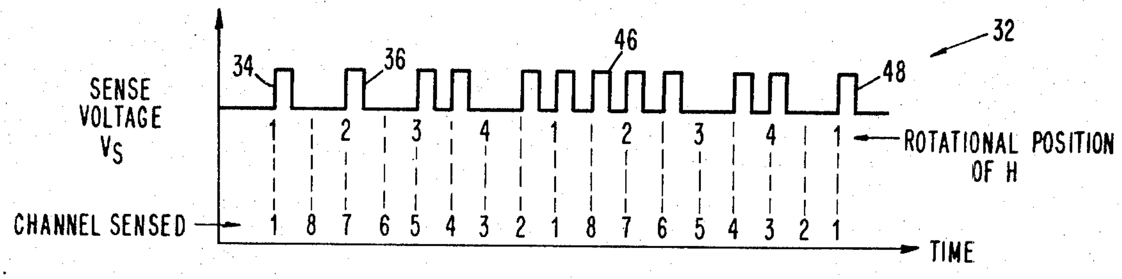
FIG. 5 is a plot of sense voltage $V_s$ from the conductor sense loop of FIG. 4, plotted against the rotational position of the propagation field H.

FIG. 5 shows a plot of the output sense pulses $V_s$ plotted as a function of the rotational position of the magnetic drive field H. Also indicated is the channel which is being sensed during the rotation of magnetic field H. The domains 26 in FIG. 4 lead to the pulse train 32 shown in FIG. 5. For instance, at the initial instant of time, a domain 26 is sensed by loop 30 in channel 1. The time rate of change of magnetic flux in sense loop 30 due to domain 26 in channel 1 produces an output voltage pulse 34. The next channel to be sensed is channel 8. Since no domain is located at pole position 4 of T-bar 36, no voltage output is shown in FIG. 5. Channel 7 does have a cylindrical domain 26 located at pole position 1 of T-bar 38, so it will produce an output pulse 36 upon rotation of magnetic field H to position 2. In a similar manner, information channel 6 does not have a domain at pole position 1 of T-bar 40 so a voltage output will not appear when this channel is sensed. This reasoning is continued to explain the voltage outputs $V_s$ produced from each information channel 8, 7, . . ,1 during a full cycle of rotation of magnetic field H.

During the second rotational cycle of magnetic field H, domain 26 at pole position 1 of T-bar 42 (channel 8) will have moved to the sense loop 30 which crosses channel 8 between pole position 1 on T-bar 36 and pole position 2 on I-bar 44. Consequently, a voltage output 46 will appear from channel 8 when magnetic field H is between positions 1 and 2 during this second cycle of rotation of magnetic field H. Again, this reasoning can be continued to understand the pulse pattern for the other information channels during the second cycle of rotation of magnetic field H. During this second cycle of rotation, the last channel (1) to be sensed will produce a voltage output 48 when domain 26 at pole position 1 of T-bar 50 (channel 1) moves under the sense loop 30 where it intersects channel 1.

The sensing elements shown in these embodiments are known in the art and a detailed explanation of their fabrication and the fabrication of the various propagation means is not necessary. It is sufficient to state that T and I-bar propagation means are well known and comprise magnetically soft material deposited in patterns on a magnetic sheet 10. The in-plane magnetic field H is produced by coils which surround sheet 10, which is also well known. In the case of conductor loops used for propagation, such as is shown in FIG. 3, these are also well known in the art, as can be seen by referring to the above-cited references. These conductor loops are conveniently made of copper which can be deposited directly on magnetic sheet 10. The particular sensing elements chosen can be any well known elements, including permalloy magneto-resistive and Hall effect sensors, and conductor sense loops of, for instance, copper.

Another sensing technique which could be used in the manner taught here is magneto-optic sensing. In this case, the optical beam will move from one channel to another in such a manner that its position of intersection with each channel is staggered with respect to adjacent channels. As an alternative, a thin pencil (line) of light can be incident on a plurality of channels at once, to describe a line of light having a path similar to the path of conductor loop 30 of FIG. 4. This pencil of light would have its polarization locally affected by the presence and absence of cylindrical domains in the locations where it crosses the various information channels. This would be indicated by photosensitive detectors in a well known manner.

What has been shown is an improved sensing technique which provides multiple output signals during each cycle of propagation, i.e., the time required for domains to move one bit position. This enables the use of a single sense amplifier in a manner which is most efficient. Any sensing means can be used and the information channels can be on different magnetic sheets.

What is claimed is:

1. A magnetic device using cylindrical magnetic domains, comprising:

a magnetic medium in which said domains can be propagated;

propagation means producing drive fields for moving said domains across said sheet in a plurality of information channels during each cycle of said drive field;

sensing means associated with each said channel for sensing the presence and absence of domains in said channels, the sensing means for each channel being spatially staggered with respect to the sensing means of adjacent channels, said sensing means producing time-staggered signals during a single cycle of said drive field which are representative of the presence and absence of domains in said channels;

a single utilization means associated with said sensing means for receiving the outputs of each sensing means; and control circuitry connected to said propagation means and to said utilization means for determining which of said sensing means is providing a signal at any desired time in said drive cycle.

2. The device of claim 1, where said sensing means are serially connected, said utilization means being connected to said series connection.

3. The device of claim 1, where said sensing means comprises a plurality of separate sensing elements, each one of which is associated with a single information channel.

4. The device of claim 1, where said sensing means comprises a single element intercepting a plurality of said channels, the area of interception of each channel being spacially displaced from its area of interception with other channels.

5. The device of claim 1, where said sensing means comprises a plurality of magneto-resistive sensing elements located adjacent said information channels.

6. A device using cylindrical magnetic domains, comprising:

a magnetic sheet in which said domains exist;

bias means for stabilizing said magnetic domains;

propagation means including means for applying a repetitive sequence of drive pulses for moving said domains in response to said drive pulses, said propagation means defining a plurality of information channels in which all of said domains move under control of the same drive pulses;

sensing means associated with each said channel for detection of domains in said channels, each said sensing means being spatially staggered with respect to one another so that outputs will be sequentially produced from different sensing means during each repetition of said sequence of drive pulses;

utilization means connected to said sensing means for receiving said sequentially produced outputs;

control circuitry connected to said propagation means and to said utilization means for associating each said output with a particular information channel.

7. The device of claim 6, where said sensing elements are serially connected, said series connection being connected to said utilization means.

8. The device of claim 6, where said sensing means comprises a plurality of magneto-resistive sensing elements, each one of which is associated with a different information channel.

9. The device of claim 6, where said sensing means comprises a single sensing element intercepting each of said information channels at a location spatially displaced from its interception with other information channels.

10. A device using cylindrical magnetic domains, comprising:

a magnetic sheet in which said domains can be propagated;

first and second information channels along which said domains propagate;

propagation means for moving said domains along said channels, said propagation means including a drive source for applying repetitive cycles of first and second drive pulses to each said channel simultaneously, said domains moving to a first position in each said channel in response to the application of said first drive pulse and to a second position in each channel in response to the application of said second drive pulse;

a first sensing means for providing output signals indicative of domains in said first channel, said first sensing means being positioned to detect domains moving past said first position;

a second sensing means for providing output signals indicative of domains in said second channel, said second sensing means being positioned to detect domains moving past said second position, wherein said first and second sensing means are connected to one another; and a sense amplifier for receiving said output signals during a single cycle of said drive pulses and amplifying the output signals of said first and second sensing means, said sense amplifier being series connected to said first and second sensing means.

11. The device of claim 10, where each sensing means is comprised of magneto-resistive sensing elements.

12. The device of claim 10, where said sensing elements are serially connected to one another, the series combination being connected to said sense amplifier.

13. The device of claim 10, further including:

a utilization means connected to said sense amplifier to receive said amplified output signals therefrom during each said cycle of drive pulses; and control means connected to said utilization means and to said drive source for associating each amplified output signal with its associated information channel.

14. A magnetic device, comprising:

a magnetic medium in which magnetic domains can be propagated;

a plurality of propagation elements adjacent said magnetic medium for defining a plurality of propagation paths for domain movement in said medium;

means for applying a cycle of drive pulses to said propagation elements for simultaneously moving said domains in each said propagation paths;

a plurality of sensing means each of which is associated with a different propagation path for detection of domains in said propagation paths, each said sensing means being positionally located with respect to the sensing means associated with other propagation paths that said sensing means produce output signals representative of the presence and absence of domains in said propagation paths which are time-staggered during a single cycle of said drive pulses;

utilization means responsive to said time-staggered signals during a cycle of said drive pulses;

control means for associating each said output signal with domains from a particular propagation path.

* * * * *